United States Patent [19]
Notaro et al.

[11] 3,717,684
[45] Feb. 20, 1973

[54] PROCESS FOR PREPARING CHLORINATED AROMATICS

[75] Inventors: Vincent A. Notaro; Charles M. Selwitz, both of Monroeville, Pa.

[73] Assignee: Gulf Research & Development Company, Pittsburgh, Pa.

[22] Filed: Sept. 11, 1970

[21] Appl. No.: 71,429

[52] U.S. Cl. .........260/650 R, 260/649 R, 260/649 F, 260/649 D, 260/650 F, 260/651 R
[51] Int. Cl. ..........................C07c 25/04, C07c 25/14
[58] Field of Search.................. 260/649 R, 649 F, 649 DP, 650 R, 260/650 F, 651 R

[56] References Cited
UNITED STATES PATENTS

| | | | |
|---|---|---|---|
| 3,160,653 | 12/1964 | Benning et al. | 260/650 R |
| 3,591,644 | 7/1971 | Notaro et al. | 260/650 R |

Primary Examiner—Howard T. Mars
Attorney—Meyer Neishloss, Deane E. Keith and Joseph J. Carducci

[57] ABSTRACT

A process for preparing a nuclear polychloro alkyl aromatic compound which involves heating an alkyl aromatic in the presence of a nitrate ion, a nitrite ion, NO or $NO_2$, HCl, water, oxygen and a strong acid, wherein the molar ratio of HCl to aromatic compound is initially at a level of about 4:1 to about 10:1 and such ratio is maintained at approximately such level during the course of the reaction.

6 Claims, No Drawings

PROCESS FOR PREPARING CHLORINATED AROMATICS

This application is directed to a process for adding more than one chlorine to the nucleus of an aromatic compound.

In out application Ser. No. 839,042, filed July 3, 1969, now U.S. Pat. No. 3,636,170 and assigned to the same assignee as the present invention, we have shown that we can prepare a nuclear chloro or a nuclear bromo aro-matic compound by heating an aromatic compound in the presence of a nitrate ion, a nitrite ion, NO or $NO_2$, a chloride ion or bromide ion, water, oxygen and a strong acid. The preparation of a nuclear polychloro alkyl aromatic compound from an alkyl aromatic in accordance with such procedure is extremely difficult, however, since increased nuclear chlorination has a tendency to result in the undesired chlorination of the alkyl substituent. We have now found that the desired polychlorination can take place, using the procedure defined in said application, without undue chlorination of the alkyl substituent, by employing HCl and aromatic compound in an initial molar ratio of about 4:1 to about 10:1 and maintaining said molar ratio at approximately said initial level during the course of the reaction.

The alkyl aromatic hydrocarbon reactant employed herein can be one free of nuclear halogenation or one carrying a halogen (chloro, bromo, fluoro or iodo) substituent thereon. The alkyl substituent can have from one to 20 carbon atoms, preferably from one to five carbon atoms, examples of which are methyl, ethyl, n-propyl, isopropyl, isobutyl, secondary butyl, n-butyl, 3-heptyl, 1-dodecyl, 2-dodecyl, 3-dodecyl, 4-dodecyl, 1-eicosyl, etc. Examples of alkyl aromatics that can be used are toluene, ortho xylene, meta xylene, para xylene, ethyl benzene, mesitylene, pseudocumene, hemimellitene, 2-methylethylbenzene, 3-methylethylbenzene, 4-methylethylbenzene, ortho diethylbenzene, meta diethylbenzene, para diethylbenzene, cumene, ortho cymene, meta cymene, para cymene, 2-phenylbutane, 3-phenylhexane, 4-(para-methylphenyl)-nonane, 1-phenylheptane, alpha-methylnaphthane, beta-methylnaphthalene, 4,4'-dimethylbiphenyl, 1,4,5-trimethylanthracene, 1-phenyleicosane, etc.

Also present in the reaction system is a substance selected from the group consisting of nitrate ions, nitrite ions, NO and $NO_2$. Thus, any compound falling within the above definition or which, for example, by ionization, oxidation or disproportionation, under the reaction conditions defined herein will result in the same can be employed. By "nitrate ions" we mean to include $NO_3^-$, a singly charged anion containing one nitrogen atom and three oxygen atoms. By "nitrite ions" we mean to include $NO_2^-$, a singly charged anion containing one nitrogen atom and two oxygen atoms. Examples of compounds that can be employed include nitric acid, sodium nitrate, cesium nitrate, sodium nitrite, potassium nitrite, nitric oxide, nitrous anhydride, nitrous acid, nitrogen dioxide, nitrogen tetroxide, nitric anhydride, nitrosyl chloride, nitrosyl bromide, nitroxyl chloride, etc.

Additionally there must be present in the reaction system HCl to chlorinate the alkyl aromatic defined above, water, molecular oxygen and a strong acid. By "strong acid" we mean to include protonic acids having ionization constants at 25° C. greater than about $10^{-2}$. Such acids include perchloric acid, toluene sulfonic acid, trifluoroacetic acid, sulfuric acid, iodic acid, etc. Acids that fall outside the above definition, for example, hydrofluoric acid, phosphoric acid, boric acid, mandelic acid, benzoic acid, etc., would not be suitable for use herein.

The reaction defined herein is simply effected by bringing the materials together in contact with each other under specified conditions. The amount of nitrate ion, nitrite ion, NO or $NO_2$ employed, on a molar basis, relative to the alkyl aromatic compound, can be from about 2:1 to about $1:10^6$, preferably from about 1:1 to about 1:10. On a molar basis, relative to the alkyl aromatic compound, water can be present in the range of about 1000:1 to about 0.1:1, preferably about 10:1 to about 2:1. The amount of molecular oxygen that can be employed relative to the alkyl aromatic compound reactant, on a molar basis, can be from about 1000:1 to about 1:10, preferably from about 10:1 to about 1:1. The amount of strong acid employed relative to water, on a molar basis, can be from about 2:1 to about 1:20, preferably from about 1:2 to about 1:10.

The molar ratio of HCl to alkyl aromatic compound is critical for nuclear polychlorination with reduced chlorination of the alkyl substituent on the aromatic ring. The initial molar ratio of HCl to the alkyl aromatic reactant must be in the range of about 4:1 to about 10:1, preferably about 5:1 to about 8:1. Additionally, it is critical that the molar ratio of HCl to alkyl aromatic compound be maintained as close as possible to the initial level throughout the course of the reaction. This can be done by intermittently adding HCl to the reaction system to bring the molar ratio to the initial level, although better control is achieved by adding HCl continuously at a rate so that there is little or no significant departure from the initial molar level.

The temperature employed during the process can range from about 15° to about 200° C., preferably from about 60° to about 150° C., the pressure from about 0.1 to about 10,000 pounds per square inch gauge, preferably from about ten to about 1000 pounds per square inch gauge, but most preferably from about 50 to about 150 pounds per square inch gauge, and the contact time from about 0.0001 to about 200, preferably from about one to about ten hours.

At the end of the reaction period, the desired chloro aromatic compound can be recovered from the reaction mixture in any suitable manner, for example, by phase separation and distillation at a temperature of about 50° to about 200° C. and a pressure of about 0.001 to about ten pounds per square inch gauge. Depending upon the boiling points of the products in the reaction mixture, the individual components thereof, including the desired chloro aromatic, will come off individually overhead and can thus be easily recovered.

The process of the invention can further be illustrated by the following.

EXAMPLE I

Into a glass pressure reactor there was added 600 millimols of HCl, 50 millimols of $HNO_3$, 4963 millimols of water, 100 millimols of ortho xylene and 592 millimols sulfuric acid. The reactor was pressured with oxygen to 170 pounds per square inch gauge and maintained at this level during the run. The contents of the reactor were heated at 90° C., while stirring, for 20.7 hours and for an additional five hours at 100° C. Twice 25 millimols of $HNO_3$ were additionally added to the reaction system, the first time at the end of 6.7 hours, the second at the end of 20.7 hours. During the course of the reaction 198.0 millimols of oxygen were consumed.

EXAMPLE II

Into a glass pressure reactor there was added 600 millimols of HCl, 50 millimols of $HNO_3$, 4963 millimols of water, 100 millimols of ortho xylene and 592 millimols sulfuric acid. The reactor was pressured with oxygen to 150 pounds per square inch gauge and maintained at this level during the run. The contents of the reactor were heated at 60° C., while stirring, for six hours. At the end of the time the aqueous layer and the hydrocarbon layer were separated from each other. Approximately 100 millimols of the hydrocarbon layer, 600 millimols of HCl, 50 millimols of $HNO_3$, 4963 millimols of water and 592 millimols of sulfuric acid were heated for 6.5 hours at 60° C. under 150 pounds per square inch gauge of oxygen for 6.5 hours. At the end of this time the aqueous layer and the hydrocarbon layer were again separated from each other. Approximately 100 millimols of the latter hydrocarbon layer, 600 millimols of HCl, 50 millimols of $HNO_3$, 4963 millimols of water and 592 millimols of sulfuric acid were heated for 6.5 hours at 90° C. under 150 pounds per square inch gauge of oxygen. During the course of the reaction a total of 110.4 millimols of oxygen were consumed.

In each of the two examples described above, at the end of the reaction the aqueous layer was separated from the hydrocarbon layer by decantation and the latter was dissolved in ethyl ether. The aqueous layer was extracted with ethyl ether and the ether layers were combined. To remove trace amounts of HCl the combined ether layers were treated with saturated aqueous NaCl and then dried over molecular sieves and anhydrous $Na_2SO_4$. The ether solvent was removed by vacuum evaporation and the products analyzed by gas-liquid chromatography. The results obtained are tabulated below in TABLE I.

TABLE I

| Example | I | II |
|---|---|---|
| Products, Weight Per Cent | | |
| Ortho Xylene | 0 | 0 |
| Nuclear Monochloro Ortho Xylene | 0 | 0 |
| Nuclear Dichloro Ortho Xylene | 0 | 16.7 |
| Nuclear Trichloro Ortho Xylene | 27.1 | 42.2 |
| Nuclear Tetrachloro Ortho Xylene | 28.6 | 28.9 |
| Chloroalkyl, Nuclear Chloro Ortho Xylenes | 42.0 | 8.3 |
| Other Compounds Not Identified | 2.3 | 2.5 |

The advantages of operating in accordance with the process defined and claimed herein are obvious from a study of the above data. In EXAMPLE I, 42 per cent of the product consisted of undesired ortho xylenes wherein the alkyl substituent had been chlorinated. In EXAMPLE II which was operated in accordance with the claimed procedure, only 8.3 per cent of the product was chlorinated in an alkyl substituent. This represents an improvement of about 80 per cent over EXAMPLE I. While 16.7 per cent of nuclear dichloro ortho xylene was present in the product obtained in EXAMPLE II and none in EXAMPLE I, the nuclear dichloro ortho xylene in EXAMPLE II can be recovered, for example, by distillation, and used together with fresh ortho xylene charge.

Obviously, many modifications and variations of the invention, as hereinabove set forth, can be made without departing from the spirit and scope thereof, and therefore only such limitations should be imposed as are indicated in the appended claims.

We claim:

1. A process for preparing a nuclear polychloro alkyl aromatic hydrocarbon without undue chlorination of the alkyl substituent on the aromatic hydrocarbon which comprises contacting an alkyl aromatic hydrocarbon, wherein the alkyl substituent has from one to 20 carbon atoms, with (1) a nitrate ion, a nitrite ion, NO or $NO_2$, (2) HCl, (3) water, (4) molecular oxygen and (5) a protonic acid having an ionization constant at 25° C. greater than about $10^{-2}$ selected from the group consisting of perchloric acid, toluene sulfonic acid, trifluoroacetic acid, sulfuric acid and iodic acid at a temperature of about 15° to about 200° C. and a pressure of about 0.1 to about 10,000 pounds per square inch gauge for about 0.0001 to about 200 hours, wherein the amount of nitrate ion, nitrite ion, NO or $NO_2$, on a molar basis, relative to the alkyl aromatic hydrocarbon reactant, is from about 2:1 to about $1:10^6$, the initial molar ratio of HCl to the alkyl aromatic hydrocarbon reactant is in the range of about 4:1 to about 10.1, the amount of water, on a molar basis, relative to the alkyl aromatic compound reactant is in the range of about 1000:1 to about 0.1:1, the amount of molecular oxygen, on a molar basis, relative to the alkyl aromatic hydrocarbon reactant, is from about 1000:1 to about 1:10, and the amount of protonic acid, on a molar basis, relative to water, is from about 2:1 to about 1:20, and maintaining the molar ratio of HCl to the alkyl aromatic hydrocarbon reactant at approximately the initial level during the course of the reaction.

2. The process of claim 1 wherein the reaction temperature is in the range of 60° to about 150° C., the pressure about ten to about 1000 pounds per square inch gauge, the contact time about one to about ten hours, the molar ratio of nitrate ion, nitrite ion, NO or $NO_2$ to the alkyl aromatic hydrocarbon reactant is in the range of about 1:1 to about 1:10, the initial molar ratio of HCl to the alkyl aromatic hydrocarbon reactant from about 5:1 to about 8:1, the molar ratio of water to the alkyl aromatic hydrocarbon reactant is from about 10:1 to about 2:1, molar ratio of molecular oxygen to alkyl aromatic hydrocarbon reactant is from about 10:1 to about 1:1 and the molar amount of protonic acid relative to water is from about 1:2 to about 1:10.

3. The process of claim 1 wherein a nitrate ion is present and the same is obtained from $HNO_3$.

4. The process of claim 1 wherein said protonic acid is sulfuric acid.

5. The process of claim 1 wherein said alkyl aromatic hydrocarbon reactant is xylene.

6. The process of claim 1 wherein said alkyl aromatic hydrocarbon reactant is ortho xylene.

* * * * *